United States Patent
Line et al.

(10) Patent No.: US 9,266,407 B2
(45) Date of Patent: Feb. 23, 2016

(54) CLIMATE CONTROL SYSTEM FOR A VEHICLE AND A METHOD OF CONTROL

(75) Inventors: Johnathan Andrew Line, Northville, MI (US); Michael Kolich, Windsor, CA (US); Paul Bryan Hoke, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 695 days.

(21) Appl. No.: 13/418,549

(22) Filed: Mar. 13, 2012

(65) Prior Publication Data

US 2013/0240173 A1    Sep. 19, 2013

(51) Int. Cl.
*B60H 1/00*    (2006.01)
*B60H 1/24*    (2006.01)
*B60H 3/02*    (2006.01)

(52) U.S. Cl.
CPC .............. *B60H 1/241* (2013.01); *B60H 3/02* (2013.01); *B60H 3/024* (2013.01)

(58) Field of Classification Search
CPC .......... B60H 3/02; B60H 1/241; B60H 3/024; B60H 1/00785; B60H 1/248; B60H 1/249
USPC .......... 454/75, 103, 104, 105, 137, 139, 141, 454/156, 158, 160; 165/41, 104.34; 96/118
See application file for complete search history.

(56) References Cited

U.S. PATENT DOCUMENTS

| | | | | |
|---|---|---|---|---|
| 4,340,112 | A * | 7/1982 | Sutoh et al. | 165/229 |
| 5,054,378 | A * | 10/1991 | Speece | 454/137 |
| 5,341,652 | A * | 8/1994 | Tajiri et al. | 62/244 |
| 5,566,880 | A * | 10/1996 | Khelifa et al. | 237/12.3 A |
| 5,938,523 | A * | 8/1999 | Khelifa et al. | 454/156 |
| 5,941,767 | A * | 8/1999 | Fukuda | 454/230 |
| 5,975,191 | A * | 11/1999 | Ohashi et al. | 165/43 |
| 6,481,222 | B1 | 11/2002 | Denniston | |
| 6,530,973 | B2 | 3/2003 | Gielda | |
| 6,796,894 | B1 * | 9/2004 | Matsuno et al. | 454/139 |
| 2001/0029162 | A1 * | 10/2001 | Yoshinori et al. | 454/137 |
| 2008/0083230 | A1 * | 4/2008 | Giallombardo | 62/93 |
| 2008/0299226 | A1 * | 12/2008 | Mentkow et al. | 424/683 |
| 2010/0107673 | A1 * | 5/2010 | Nakaguro et al. | 62/271 |

FOREIGN PATENT DOCUMENTS

DE    19653964 A1 *    6/1998    ............... B60H 3/06

OTHER PUBLICATIONS

English Machine Translation of DE19653964A1.*

* cited by examiner

*Primary Examiner* — Gregory Huson
*Assistant Examiner* — Dana Tighe
(74) *Attorney, Agent, or Firm* — Vichit Chea; Brooks Kushman P.C.

(57) ABSTRACT

A climate control system for a vehicle and a method of control. The climate control system may include a trim component and a ventilation system. The ventilation system may have a desiccant having volcanic rock particles. Air is circulated through the desiccant to reduce air humidity in the vehicle passenger compartment.

16 Claims, 3 Drawing Sheets

CLIMATE CONTROL SYSTEM FOR A VEHICLE AND A METHOD OF CONTROL

TECHNICAL FIELD

The present application relates to a climate control system for a vehicle and a method of control.

BACKGROUND

A desiccant based humidification/dehumidification system is disclosed in U.S. Pat. No. 6,481,222.

SUMMARY

In at least one embodiment, a climate control system for a vehicle is provided. The climate control system may include a trim component and a ventilation system. The trim component may be configured to be disposed in a vehicle passenger compartment. The ventilation system may have a desiccant that has volcanic rock particles. The desiccant may be disposed proximate the trim component. Air may be circulated through the trim component and the desiccant to reduce air humidity in the vehicle passenger compartment.

In at least one embodiment, a climate control system for a vehicle is provided. The climate control system may include a trim component disposed in a vehicle passenger compartment and a ventilation system for circulating air through the trim component. The ventilation system may include a desiccant, an inlet air passage, and an outlet air passage. The desiccant may have volcanic rock particles and may be disposed proximate the trim component. The inlet air passage may provide air to the desiccant. The outlet air passage may receive air from the desiccant. An HVAC system may be disposed proximate an instrument panel and may be fluidly coupled to the inlet air passage and the outlet air passage. Air may be circulated from the HVAC system to the desiccant via the first air passage to reduce moisture in the air in the vehicle passenger compartment.

In at least one embodiment, a method of controlling a climate control system disposed in a passenger compartment of a vehicle is provided. The climate control system may include a ventilation system that circulates air through a desiccant having volcanic rock particles, a first valve for controlling the flow of air from a HVAC system to the climate control system, and a second valve for controlling the flow of air to the HVAC system. The method may include determining an operation mode and opening the first valve to permit air to flow from the HVAC system to the desiccant and closing the second valve to inhibit airflow from the desiccant to the HVAC system when a ventilation mode is selected.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
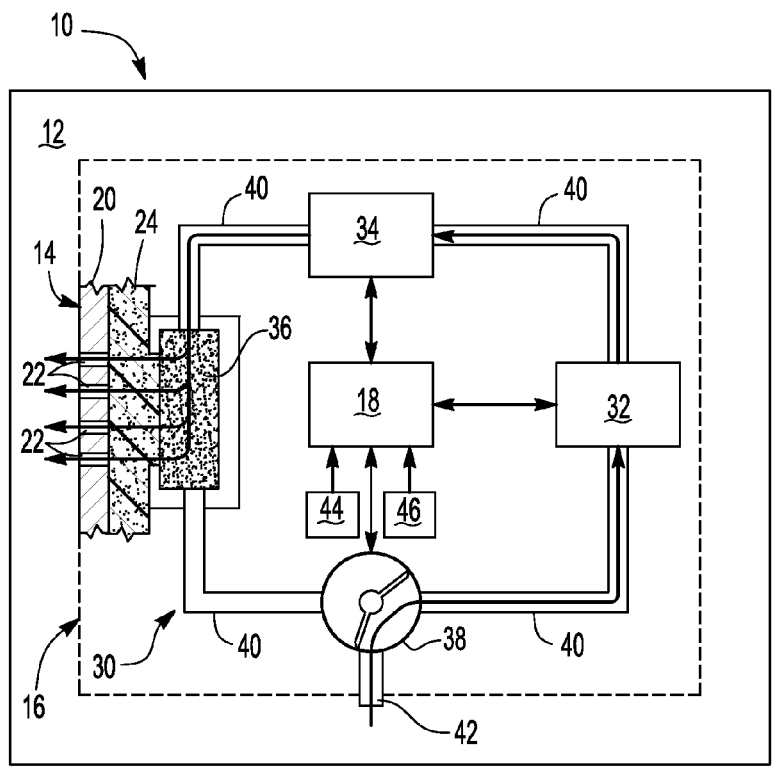
FIG. 1 is a schematic of a first embodiment of a climate control system illustrating airflow in a first direction.

Referring to FIG. 1, a schematic representation of a vehicle 10 is shown. The vehicle 10 may be a motor vehicle, such as a car or truck. The vehicle 10 may have a passenger compartment 12, a first trim component 14, a climate control system 16, and at least one control module 18.

The passenger compartment 12 may be disposed inside the vehicle 10 and may receive one or more occupants. The first trim component 14 may be disposed in the passenger compartment 12. The first trim component 14 may be a vehicle seat, door panel, console, package tray, interior trim panel, or headliner and may include a trim cover 20.

The trim cover 20 may form at least a portion of an exterior surface of the first trim component 14. The trim cover 20 may be made of any suitable material, such as fabric, leather, vinyl, a polymeric material such as plastic, or combinations thereof. The trim cover 20 may include a plurality of openings 22 that may permit air to pass through the trim cover 20. In at least one embodiment, the trim cover 20 may be disposed proximate or adjacent to a spacer material 24, such as a cushion made of an air permeable material like an open cell foam, that may have air passages or openings that permit air to pass through the spacer material 24.

The climate control system 16 may be provided to circulate air and/or change the temperature of circulated air. In FIG. 1, the climate control system 16 is configured as a self-contained module that may be spaced apart from and not fluidly connected to a vehicle HVAC (heating ventilation and air conditioning) system that may be generally disposed under an instrument panel of the vehicle 10. The climate control system 16 may include a ventilation system 30 having a blower 32, a heat exchanger 34, a desiccant 36, a first valve 38, and at least one air duct 40.

The blower 32 may be provided to circulate air through the ventilation system 30. The blower 32 may be configured as a fan or blower wheel that may be rotated by an electric motor. The blower 32 may be reversible. As such, the blower 32 may circulate air through the ventilation system 30 in a first direction and in a second direction disposed opposite the first direction depending on its direction of rotation.

The heat exchanger 34 may be fluidly connected to the blower 32 by the air duct 40. The heat exchanger 34 may be configured to heat and/or cool air that passes through the ventilation system 30. The heat exchanger 34 may be of any suitable type. For example, the heat exchanger may be configured as a resistance wire heater, a positive temperature coefficient (PTC) heater, a fluid-based heat exchanger like a heater core or evaporator core, or a thermoelectric device that may or may not be thermodynamically reversible. Examples of devices that may be thermodynamically reversible (or that may heat and cool air) include Peltier devices or devices that provide Peltier, Seebeck or Thomson effects. The heat exchanger 34 may be omitted in one or more embodiments.

The desiccant 36 may be fluidly connected to the heat exchanger 34 by the air duct 40. The desiccant 36 may be provided to capture moisture from air. The desiccant 36 may be made partially or entirely from volcanic rock particles, such as ash or small volcanic rocks. Volcanic rock particles are capable of absorbing and desorbing moisture without damage to its crystal structure and may be recyclable. The desiccant 36 may be configured as a replaceable cartridge or filter that may include an air permeable membrane that may contain the volcanic rock particles while permitting air to pass through. The desiccant 36 may be mounted to or in the air duct 40. In at least one embodiment, the desiccant 36 may be located proximate or may engage the trim cover 20 and/or spacer material 24 to help capture moisture from air passing through the openings 22 in the trim cover 20.

The first valve 38 may help control or direct airflow through the ventilation system 30. In at least one embodiment, the first valve 38 may be disposed in the air duct 40 between the blower 32 and the desiccant 36. The first valve 38 may also be connected to a port 42 that may permit air to enter or exit the ventilation system 30. The port 42 may be disposed in the passenger compartment 12 and may receive air from or exhaust air to the passenger compartment 12. The first valve 38 may be coupled to an actuator, such as a solenoid or motor, and may move between a plurality of positions. For example, the first valve 38 may move between a first position and a second position as will be described in more detail below. The first valve 38 may also be positioned in intermediate positions or "mixed mode" positions between the first and second positions in one or more embodiments.

One or more controllers or control modules 18 may be provided to monitor and control various components and systems of the vehicle 10 and/or climate control system 16. For example, the control module 18 may be electrically connected to or communicate with components of the climate control system 16, such as the blower 32, heat exchanger 34, and first valve 38. In addition, the control module 18 may also process input signals or data from various input devices or sensors. These input devices may include a humidity sensor 44 and an input device 46.

The humidity sensor 44 may be configured to detect the humidity of air in the passenger compartment. The humidity sensor 44 may be provided with the climate control system 16 or may be provided with the HVAC system in one or more embodiments.

The input device 46, if provided, may be configured to receive an operator input indicative of an operation mode of the climate control system 16. Operation modes may include an "off" setting in which operation of the climate control system 16 is disabled and at least one "on" setting in which operation of the climate control system 16 is enabled. Additional settings may be selected when operation of the climate control system 16 is enabled. For instance, a cool setting in which cooled air is circulated through the ventilation system 30 or a heat setting in which heated air is circulated through the ventilation system 30 may be provided. In addition, the direction of airflow through the ventilation system 30 may be selected or associated with an operation mode. Such settings may also be automatically selected by the control module 18 based on the temperature and/or humidity of air in the passenger compartment 12. In addition, a dryer setting may also be provided or selected for removing moisture from the desiccant 36 in one or more embodiments. Such a dryer setting may be executed when the vehicle is not occupied. For example, a dryer setting may be executed at a predetermined amount of time after the vehicle ignition is turned off and/or when an occupant is not detected in the vehicle.

Figure 2:
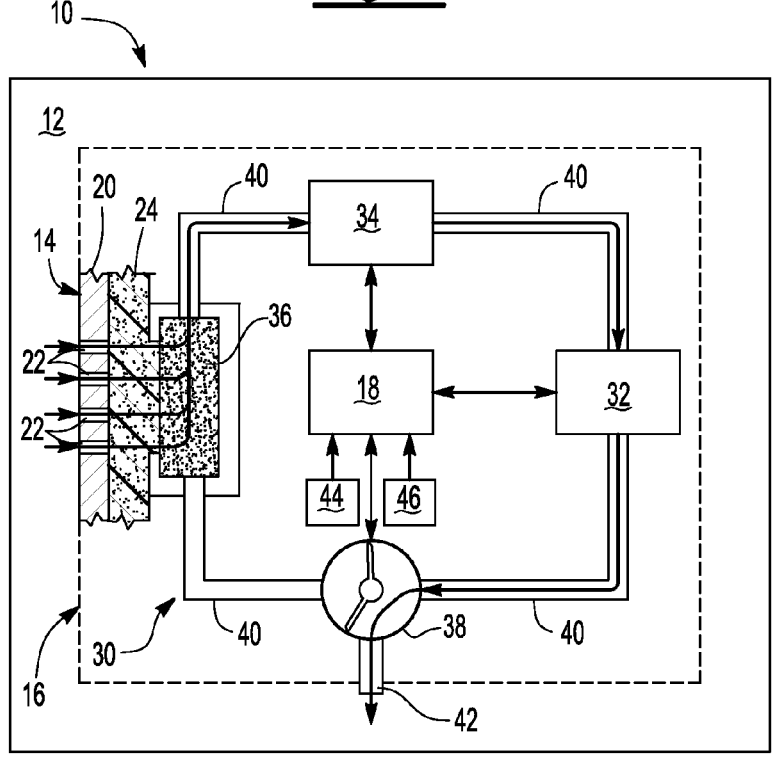
FIG. 2 is a schematic of a first embodiment of a climate control system illustrating airflow in a second direction.
Figure 3:
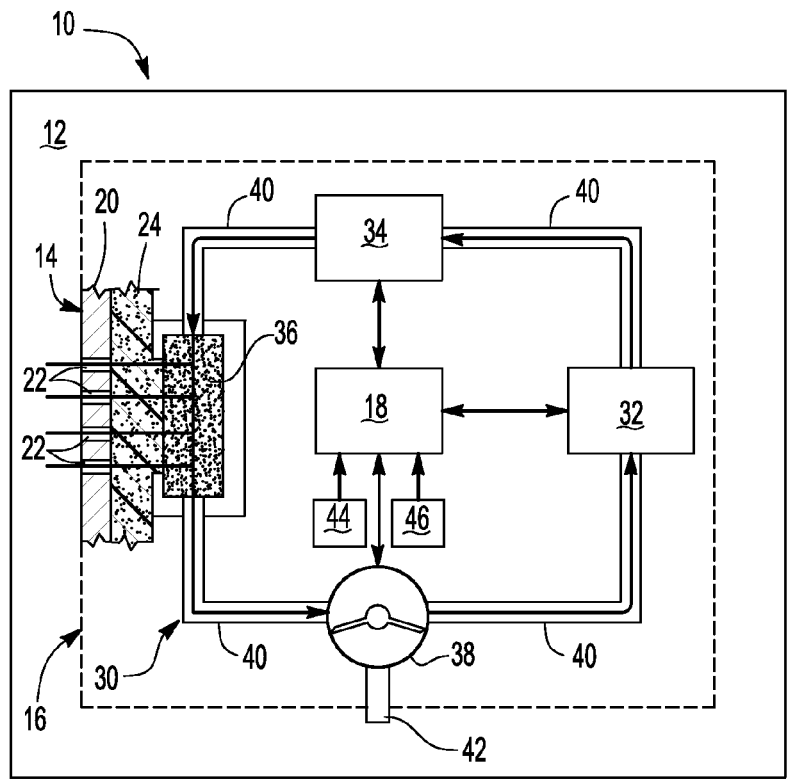
FIG. 3 is a schematic of a first embodiment of a climate control system illustrating airflow recirculation.

Referring to FIGS. 1-3, various operation modes of the climate control system 16 are illustrated.

In FIG. 1, the climate control system 16 is shown in a ventilation mode. In the ventilation mode, the blower 32 may circulate air in a first direction, or a counterclockwise direction from the perspective shown. The first valve 38 is depicted in a first position. In the first position, the first valve 38 may fluidly couple the blower 32 to the port 42 while blocking airflow from the desiccant 36 to the first valve 38. As such, air may enter the port 42 and pass through the first valve 38 due to suction created by the blower 32. Air may then exit the blower 32 and passes through the heat exchanger 34, desiccant 36, and then the openings 22 in the trim cover 20. The operation state of the heat exchanger 34 may be based in part on the air humidity detected by the humidity sensor 44. For example, if the air humidity detected by the humidity sensor 44 is greater than a threshold humidity value, then the heat exchanger 34 may cool air circulating through the ventilation system 30 to remove help remove humidity from the air. If the air humidity detected by the humidity sensor 44 is not greater than a threshold humidity value, then the heat exchanger 34 may not cool air circulating through the ventilation system 30. The threshold value may be a predetermined value based on vehicle development testing or design specifications.

In FIG. 2, the climate control system 16 is shown in a suction mode. In the suction mode, the blower 32 may circulate air in a second direction, or a clockwise direction from the perspective shown. The first valve 38 is rotated from the position shown in FIG. 1 to an intermediate position. As such, air may enter the openings 22 in the trim cover 20 and pass through the desiccant 36 and heat exchanger 34 due to suction created by the blower 32. Air may then exit the blower 32 and pass through the first valve 38 and out the port 42. The operation state of the heat exchanger 34 may be based in part on the air humidity detected by the humidity sensor 44. For example, if the air humidity detected by the humidity sensor 44 is greater than a threshold humidity value, then the heat exchanger 34 may cool air circulating through the ventilation system 30 to remove help remove humidity from the air. If the air humidity detected by the humidity sensor 44 is not greater than a threshold humidity value, then the heat exchanger 34 may not cool air circulating through the ventilation system 30.

In FIG. 3, the climate control system 16 is shown in a recirculation mode. In the recirculation mode, the blower 32 may circulate air in the first or second directions. The first valve 38 is shown in a second position in which the first valve 38 may fluidly connect the blower 32 and the desiccant 36 while inhibiting airflow through the port 42, thereby recirculating air in the ventilation system 30. As such, air may flow in a first direction (counterclockwise as shown) or second direction (clockwise) depending on the direction of rotation of the blower 32 without entering or exiting the port 42. Execution of the recirculation mode may be based on an air humidity level detected by the humidity sensor 44. For instance, if the air humidity detected by the humidity sensor 44 is greater than a threshold humidity value, air may be recirculated and the heat exchanger 34 may cool air circulating through the ventilation system 30 to remove help remove humidity from the air.

A dryer mode may be selected or automatically executed by the control module 18 in one or more embodiments. In the dryer mode, the blower 32 may circulate air in either the first or second directions and the first valve 38 may be in the first position, second position, or an intermediate position disposed between the first and second positions. The heat exchanger 34 may heat the air passing through the ventilation system 30. At least a portion of the heated air may be circulated or recirculated through the desiccant 36, thereby heating the desiccant 36 to help remove or release moisture.

Figure 4:
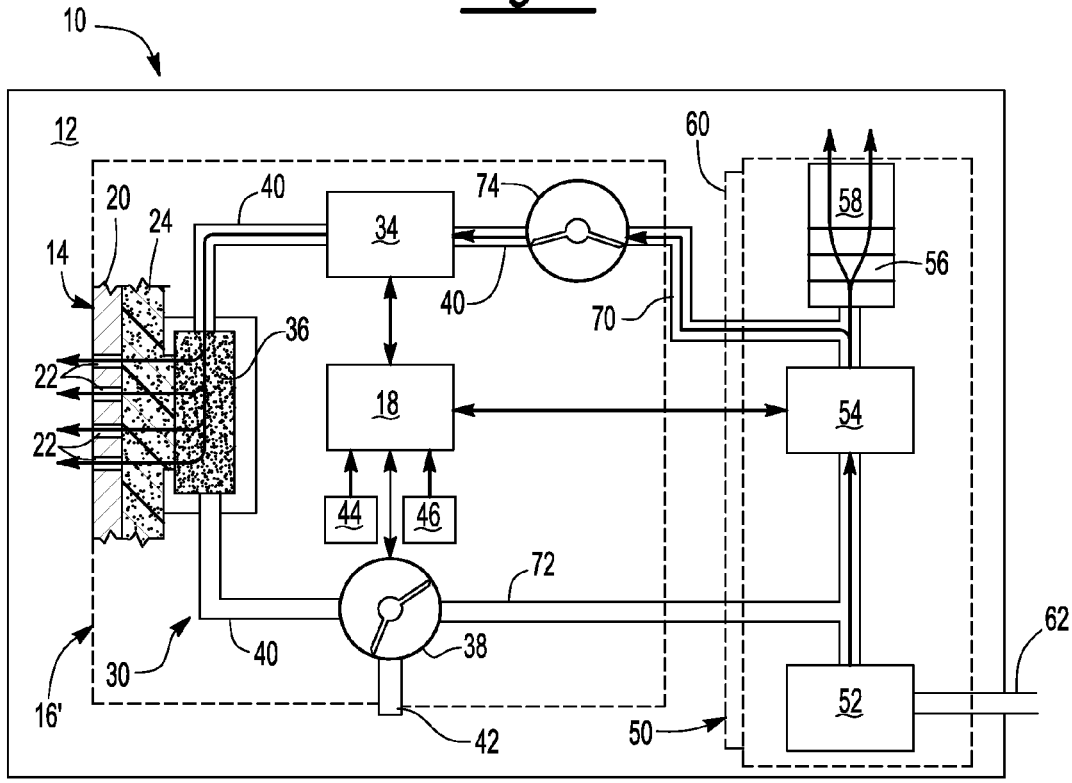
FIG. 4 is a schematic of a second embodiment of a climate control system illustrating a ventilation mode.
Figure 6:
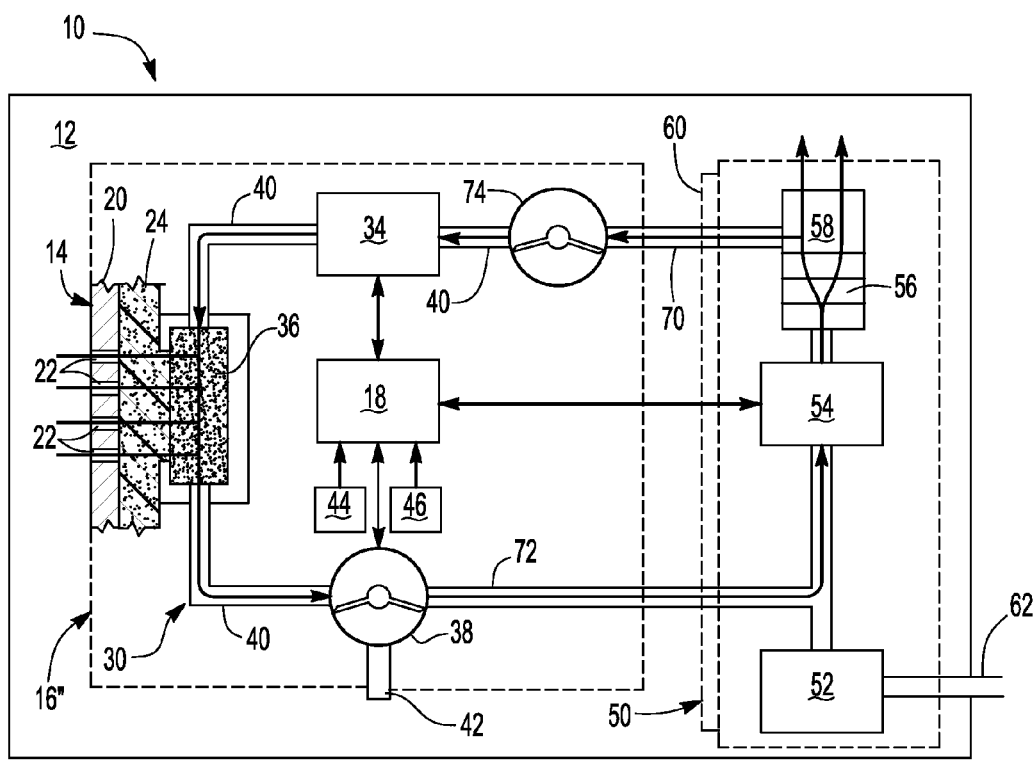
FIG. 6 is a schematic of a third embodiment of a climate control system.

Referring to FIGS. 4 and 6, second and third embodiments of a climate control system 16', 16" are shown. In these embodiments, the climate control system 16', 16" is fluidly connected to a vehicle HVAC (heating ventilation and air conditioning) system 50. The HVAC system 50 may include an air intake/recirculation chamber 52, a blower 54, at least one HVAC heat exchanger, and a plenum 58. The HVAC system 50 may be located under an instrument panel 60 in one or more embodiments.

The air intake/recirculation chamber 52 may receive air from outside the vehicle via an inlet 62 or may receive air from inside the passenger compartment 12 based on the position of a recirculation door that is provided with the air intake/recirculation chamber 52.

The blower 54 may be a fan or blower wheel that is driven by a motor as previously described. The blower 54 may rotate in a single direction in one or more embodiments such that air is received from the air intake/recirculation chamber 52.

At least one HVAC heat exchanger 56 may be disposed downstream from the blower 54. HVAC heat exchangers may include a heater core, evaporator core, or resistance wire heating element in one or more embodiments.

The plenum 58 may receive air that passes through at least one HVAC heat exchanger 56 and direct air in one or more directions, such as toward the windshield, instrument panel vents, side defroster vents, and/or floor vents.

Figure 5:
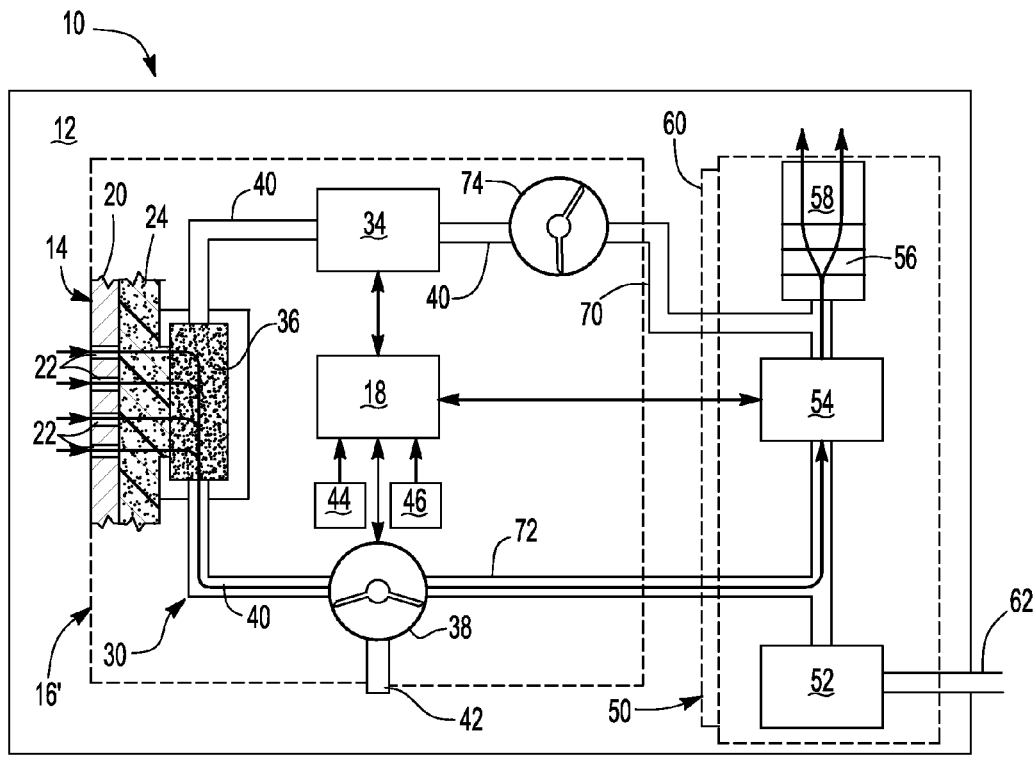
FIG. 5 is a schematic of the second embodiment of a climate control system illustrating a suction mode.

An inlet air passage 70 and an outlet air passage 72 may fluidly couple the climate control system 16 to the HVAC system 50. The inlet air passage 70 may receive air from the HVAC system. The inlet air passage 70 may be disposed downstream from the blower 54 but upstream from the HVAC heat exchanger 56 as shown in FIG. 4 or downstream from the HVAC heat exchanger 56, such as proximate the plenum 58, as shown in FIG. 5.

The outlet air passage 72 may be disposed upstream of the blower 54. As such, the outlet air passage 72 may be disposed between the air intake/recirculation chamber 52 and the blower 54 in one or more embodiments.

The climate control system 16', 16" may include a heat exchanger 34, desiccant 36, and a first valve 38 as previously described. The first valve 38 may be fluidly connected to the outlet air passage 72 rather than directly to a blower 32 that is provided with the climate control system 16 as described above. The climate control system 16', 16" may also include a second valve 74 that controls airflow through the inlet air passage 70. The second valve 74 may be controlled by an actuator such as a solenoid or motor, which in turn may be controlled by the control module 18. The second valve 74 may move between a first position in which airflow through the inlet air passage 70 is enabled and a second position in which airflow through the inlet air passage 70 is disabled.

The climate control system 16 may operate in various modes as previously described. In the ventilation mode as shown in FIG. 4, the blower 54 may circulate air in a first direction, or a counterclockwise direction from the perspective shown to the inlet air passage 70. The second valve 74 may be disposed in a first position in which airflow is permitted through the inlet air passage 70 to the heat exchanger 34 (if provided) and the desiccant 36. The first valve 38 may at least partially block airflow from the desiccant 36 through the first valve 38. As such, air may be ventilated through the openings 22 in the trim cover 20. If a heat exchanger 34 is provided, its operation state may again be based in part on the air humidity detected by the humidity sensor 44 as previously described.

In a suction mode as shown in FIG. 5, the blower 54 may circulate air in a first direction. The second valve 74 may be closed or disposed in a second position to inhibit airflow through the inlet air passage 70. The first valve 38 may be at least partially opened to permit airflow from the desiccant 36 to the outlet air passage 72. As such, air may enter the openings 22 in the trim cover 20 and pass through the desiccant 36, first valve 38, and outlet air passage 72 due to suction created by the blower 32.

A recirculation mode may also be provided by at least partially opening the first valve 38 and the second valve 74. As such, the blower 32 may circulate air to the inlet air passage 70 and through the second valve 74, heat exchanger 34, desiccant 36, first valve 38, and outlet air passage 72. An example of a recirculation mode is shown in FIG. 6, but may also be provided in the same manner with the embodiment shown in FIGS. 4 and 5.

A dryer mode may be selected or automatically executed by the control module 18 in one or more embodiments. In the dryer mode, the second valve 74 may be at least partially opened to permit the blower 54 to circulate air through the inlet air passage 70 and to the heat exchanger 34 and desiccant 36. The heat exchanger 34 may heat the air passing through the ventilation system 30. At least a portion of the heated air may be circulated or recirculated through the desiccant 36, thereby heating the desiccant 36 to help remove or release moisture. In addition, a dryer mode could be used to release moisture from the desiccant 36 to release moisture into the cabin to maintain a predetermined or comfortable level of humidity. Optionally, the heat exchanger 34 may be omitted and heated air may be provided by the HVAC system 50 in the dryer mode in one or more embodiments.

In another embodiment, the climate control system may be configured such that the dessicant 36 may be in selective communication with the environment outside the vehicle 10. As such, the climate control system may be switched to an outside air exchange mode in which humid air, such as humid air released by the desiccant 36 may be exhausted to the surrounding environment. Such air may be heated by the heat exchanger 34 to speed up drying of the desiccant 36 or enable drying of the desiccant 36 in hot ambient temperature conditions.

The climate control systems described above may help reduce moisture in air that is circulated in a vehicle passenger compartment, thereby helping improve occupant comfort. Reducing humidity levels and improving occupant comfort may also result in reduced cooling demands made by a vehicle occupant upon a HVAC system 50, thereby helping reduce energy and fuel consumption that may be otherwise be used to power the HVAC system 50. Moreover, moisture may be reduced in the air inside the vehicle to inhibit window fogging, such as at vehicle startup and/or in cold or cool environmental conditions in which fogging may otherwise occur. In addition, the climate control systems described above may provide more localized cooling, such as in a seat application in which cooling may be provided more directly to a seat occupant. Use of the desiccant may also help remove moisture and potential moisture discomfort and odors that may be associated with perspiration.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A climate control system comprising:
   a valve disposed between a port and a blower; and
   a desiccant disposed between the blower and the valve;
   wherein the valve blocks airflow from the desiccant to the port and the blower receives air from the port via the valve and circulates air through the desiccant and then through a trim component when the valve is in a first position.

2. The climate control system of claim 1 further comprising a heat exchanger fluidly connected to the blower and the desiccant via an air duct;
   wherein air enters the port and is circulated by the blower through the heat exchanger and the desiccant, and then exhausted through the trim component when the valve is in the first position.

3. The climate control system of claim 2 wherein the heat exchanger cools air received from the blower to remove moisture from air that is provided to the desiccant.

4. The climate control system of claim 2 wherein air enters the trim component and is circulated by the blower through the desiccant to the heat exchanger and is then exhausted through the port when the valve is in an intermediate position.

5. The climate control system of claim 4 wherein the blower circulates air in a first direction when the valve is in the first position and the blower circulates air in a second direction that is disposed opposite the first direction when the valve is in the intermediate position.

6. The climate control system of claim 1 wherein the desiccant is volcanic rock.

7. The climate control system of claim 1 wherein the trim component is an interior trim panel.

8. The climate control system of claim 1 wherein the trim component is a headliner.

9. A climate control system comprising:
   a first valve disposed between a port and a blower;
   a second valve disposed between the blower and a desiccant that is disposed between the first and second valves;
   wherein the second valve blocks airflow from the blower to the desiccant and the first valve enables airflow through a trim component to the desiccant and then to the blower while blocking airflow through the port in a suction mode.

10. The system of claim 9 wherein the desiccant is volcanic ash and is disposed adjacent to a spacer material that is disposed between the desiccant and openings in the trim component.

11. The system of claim 9 wherein the first valve is disposed in an inlet air passage that is disposed between the blower and an HVAC heat exchanger that is provided with an HVAC system;
    a heat exchanger is disposed between the first valve and the desiccant; and
    the second valve is disposed in an outlet air passage between the desiccant and the HVAC system;
    wherein air is circulated from the HVAC system through the desiccant and the trim component when the first valve is open.

12. The system of claim 11 wherein the blower is provided with the HVAC system and pulls air through the trim component and the desiccant via the outlet air passage when the first valve is closed and the second valve is open.

13. The system of claim 12 wherein air is recirculated through the desiccant when the first and second valves are open.

14. The system of claim 11 wherein humidity is removed from the desiccant when the first valve is open and the heat exchanger heats air received from the HVAC system.

15. The system of claim 11 wherein the inlet air passage receives air that is conditioned by the HVAC heat exchanger.

16. The system of claim 11 wherein the inlet air passage does not receive air that is conditioned by the HVAC heat exchanger.

* * * * *